United States Patent [19]
Ho

[11] Patent Number: 5,693,161
[45] Date of Patent: Dec. 2, 1997

[54] NO-FLAT TIRE AND NO FLAT TIRE INSERT

[76] Inventor: I-Chung Ho, 6958 Grovespring Dr., Rancho Palos Verdes, Calif. 90275

[21] Appl. No.: 444,830

[22] Filed: May 18, 1995

[51] Int. Cl.$^6$ .................... B60C 5/64; B60C 5/22
[52] U.S. Cl. ............... 152/342.1; 137/223; 137/614.11; 152/338.1; 152/429; 156/123
[58] Field of Search .................... 152/331.1, 337.1, 152/338.1, 341.1, 342.1, 427, 429; 156/123; 137/223, 883, 614.11; 251/149.6

[56] References Cited

U.S. PATENT DOCUMENTS

| | | | |
|---|---|---|---|
| 622,888 | 4/1899 | Forsyth | 137/223 |
| 641,345 | 1/1900 | Storz | 152/427 X |
| 660,128 | 10/1900 | Sowle | 137/223 |
| 672,271 | 4/1901 | Hilton | 137/223 |
| 807,311 | 12/1905 | Parker | 152/334.1 |
| 911,041 | 2/1909 | Hicks | 152/334.1 |
| 1,080,814 | 12/1913 | Dreger et al. | 152/334.1 |
| 1,154,817 | 9/1915 | Turner | 152/334.1 |
| 1,185,660 | 6/1916 | Harris | 152/337.1 |
| 1,226,563 | 5/1917 | Miller | 137/223 |
| 1,334,448 | 3/1920 | Gordon | 152/337.1 |
| 1,420,081 | 6/1922 | Dirienzo | 152/341.1 |
| 1,569,844 | 1/1926 | O'Brien | 152/342.1 |
| 1,908,244 | 5/1933 | Herron | 152/342.1 |
| 2,039,343 | 5/1936 | Prokul | 152/342.1 |
| 2,248,371 | 7/1941 | Matthews | 137/614.11 X |
| 2,269,244 | 1/1942 | Berry | 152/342.1 |
| 2,354,912 | 8/1944 | Eger | 152/342.1 |
| 2,440,107 | 4/1948 | Maddox | 152/342.1 |
| 2,612,461 | 9/1952 | Hallgren | 152/331.1 X |
| 2,859,791 | 11/1958 | Pellegrino | 152/334.1 |
| 3,194,180 | 7/1965 | Mackerle | 152/334.1 X |
| 3,494,403 | 2/1970 | Huber | 152/335.1 |
| 4,054,169 | 10/1977 | Devienne et al. | 152/337.1 |
| 4,884,609 | 12/1989 | Ho | 152/337.1 |

Primary Examiner—Michael W. Ball
Assistant Examiner—Francis J. Lorin

[57] ABSTRACT

A no-flat tire and no-flat tire insert for use in vehicle wheels, which includes a plurality of chambers connected to a single valve system. The single valve inflates or deflates the plurality of chambers simultaneously during charging or discharging. After charging, all chambers are isolated from each other. Puncture or damage of one or a small number of chambers will not cause the tire to go flat.

11 Claims, 7 Drawing Sheets

Figure 10
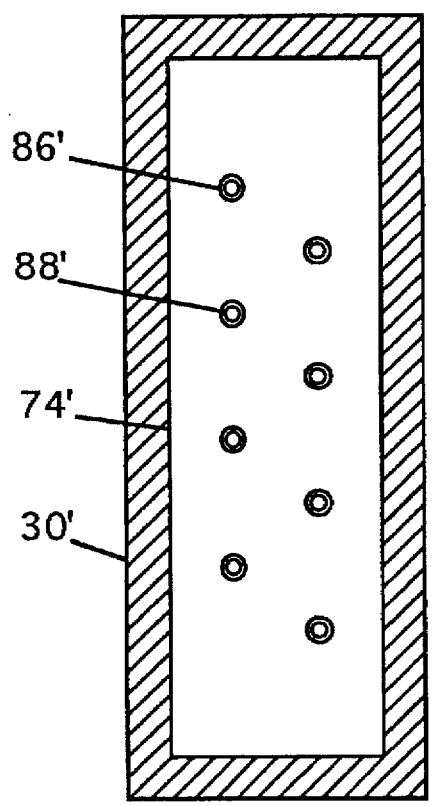
Figure 11
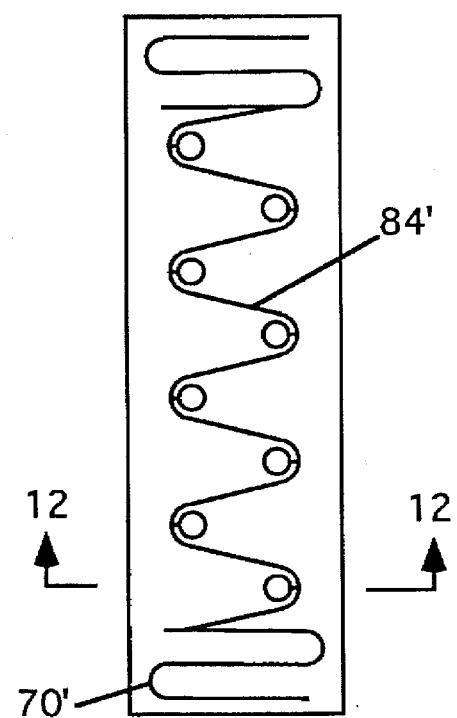
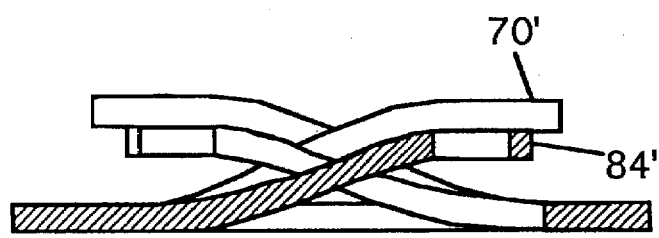
Figure 12

NO-FLAT TIRE AND NO FLAT TIRE INSERT

BACKGROUND OF THE INVENTION

This invention relates to a tire and a tire insert for use in vehicle wheels. The no-flat tire and no-flat tire insert provides a plurality of chambers within the tire, such that each chamber is isolated from each other after inflation with compressed air. The puncture of any one or more of the chambers will not effect the charge of any other chamber and the tire will not go entirely flat.

An invention disclosed earlier in 1987 and an U.S. Pat. No. 4,884,609 issued in Dec. 5, 1989 presented an initial design. The present invention is an improvement of the earlier design which simplifies the manufacturing process and reduces the cost of production.

SUMMARY OF THE INVENTION

It is an object of the present invention to provide a tire or a tire insert which contains a plurality of chambers to pressurize the tire.

It is another object of the present invention to provide a tire or a tire insert wherein the no-flat tire or tire with no-flat tire insert does not go flat if several of the chambers are punctured or damaged.

It is a further object to provide a no-flat tire or tire with no-flat tire insert which includes a plurality of chambers in which all chambers are charged or discharged from a single valve stem.

It is yet another object to provide a simplified design such that the cost of production can be reduced.

The no-flat tire and no-flat tire insert of the present invention includes a valve housing defining a valve stem, a distribution manifold and a plurality of chambers. The valve stem has a central valve rod which leads to a push plate in the valve body. The distribution plate, which has a plurality of openings and its individual shut-off valves. Each of the openings lead to a separate chambers.

The spring-loaded closed shut-off valves have a valve rod protruding beyond the distribution plate and biased against the push plate. When the central rod is pushed down during charging, the push plate pushes down on the valve stems of the shut-off valves, thus opening the distribution valves and allowing charge air to fill the plurality of chambers. After the desired tire pressure is reached, the air source is uncoupled from the valve stem, the internal air pressure and the spring on each of the shut-off valves push up the shut-off valves and closes each valve opening.

When discharge of air from the tire is desired, the push rod is turned and screwed downward, the push plate will push against the valve rod and open all the valves. The push plate will remain in the down position and keep the valves open, thus allowing the charge air to escape from all the chambers simultaneously.

BRIEF DESCRIPTION OF THE DRAWINGS

FIG. 10 is a cross-sectional view of the valve body taken along line 10—10 of FIG. 9.

FIG. 11 is a detailed view of the springs used in FIG. 9.

FIG. 12 is a cross-sectional view of the spring taken along line 12—12 of FIG. 11.

DETAILED DESCRIPTION OF THE INVENTION

Figure 1:
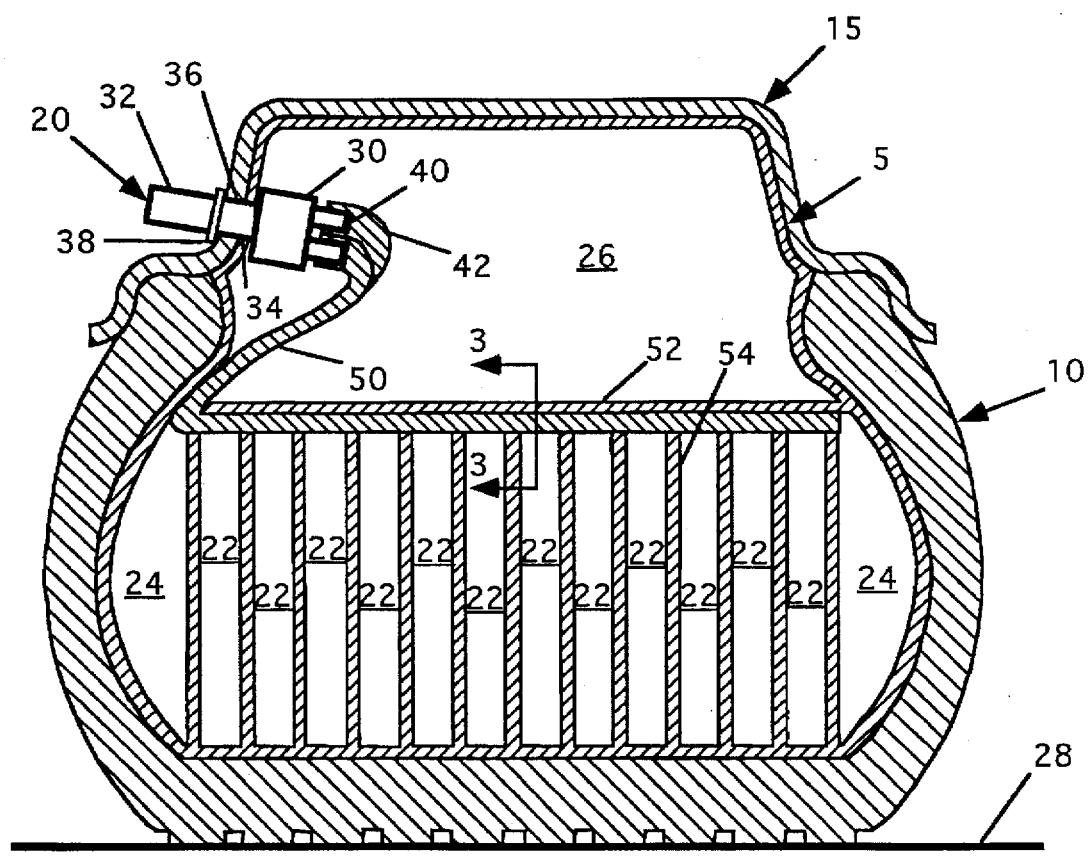
FIG. 1 is a cross-sectional view of an inflated no-flat tire insert of the present invention inserted in a tire.

FIG. 1 shows a no-flat tire insert 5 of the present invention being inserted and inflated in a tire 10 and the rim 15 of the tire (the center portion of the rim is not shown in FIG. 1). A charging and discharging valve 20 is mounted on the tire rim 15. As shown, the no-flat tire insert 5 comprises the valve 20 and a plurality of chambers. The size, the shape, and the number of chambers may vary for any given tire. As shown in FIG. 1, there are twelve smaller and similar sized chambers 22, two side chambers 24 and a larger chamber 26. The larger chamber 26 is at the inner radius of the tire and away from the road surface 28 where the least amount of road hazard is expected at this location. The valve body 30 of the valve 20 is located inside the larger chamber 26 and the valve stem 32 protrudes out from the chamber wall at 34. While installing the no-flat tire insert 5 into the tire 10, the valve stem 32 of the valve 20 is pass through the valve hole 36 in the tire rim 15 and locked in place with a lock nut 38 or any other means commonly in use today. All smaller chambers 22 and side chambers 24 are connected to a separate valve opening 40 via connecting tubes 42. One of the valve openings 40, however is directly open to the larger chamber 26 and no connecting tube is needed. During the charging of the tire 10, pressurized air source is coupled to the valve stem 32 and all the chamber are charged simultaneously. After the tire is fully charged and inflated, the air source is removed and all chambers are isolated from each other. The complete operation of the valve will be described in more detail later. If one or more of the small chamber is damaged by nails or other foreign objects on the road surface, only those damaged chambers will loose its charge and become deflated. The remaining smaller or side chambers, 22 and 24 respectively, and the larger chamber 26 will not be damaged but expand slightly to take up the extra spaces left by the damaged and deflated chambers. The overall tire pressure may decrease slightly by the proportion of the volume of the deflated chambers against the total volume of all chambers, but will not go flat. The user can simply remove the damaging nails or other objects and add more compressed air to the remaining un-damaged chambers without the need of repairing the damages.

Figure 2:
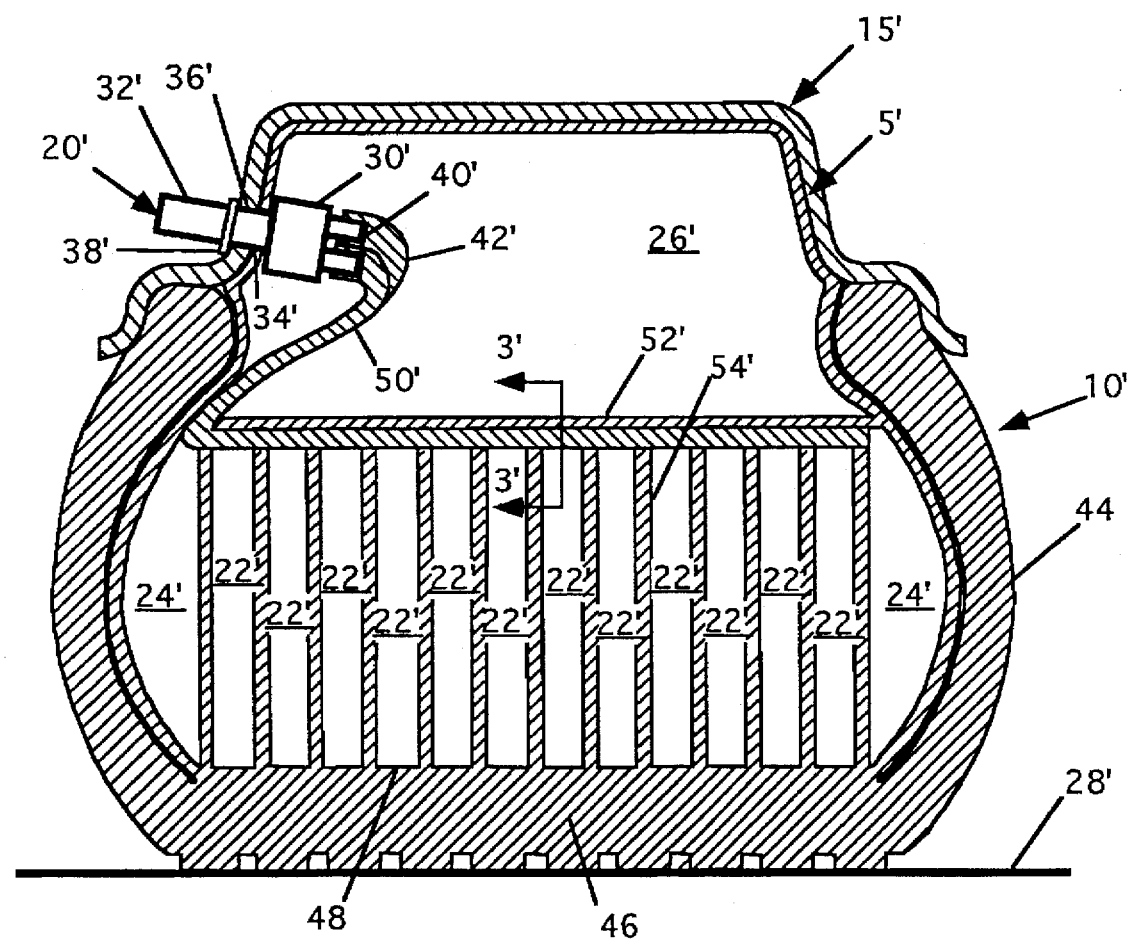
FIG. 2 is a cross-sectional view of an inflated no-flat tire of the present invention.

FIG. 2 is a no-flat tire 44 of the present invention being installed and inflated on the rim 15' (the center portion of the rim is not shown in FIG. 2), the no-flat tire has integral, multiple interior air chambers 22', 24', and 26'. It basically combines the tire 10' with the no-flat tire insert 5' into an integral tubeless tire 44. The flat portion of the tire 46 becomes a portion of the chamber walls 48 for the small chambers 22'. The first step of manufacturing this tire is the same as making the no-flat tire insert, except that before final vulcanizing, the remainder of the tire structure, such as the steel belting, extra ply of tire layers and the core of the tire body are added to or molded with the extruded chambers and vulcanized together to become an integral piece of the no-flat tire 44. Other construction is the same as those presented in FIG. 1. The operation of this no-flat tire is the same as the tire with a no-flat tire insert.

Figure 3:
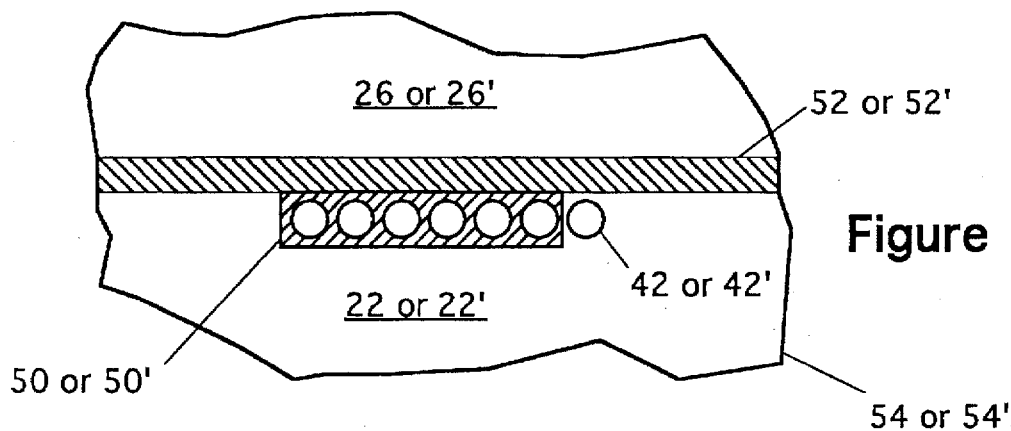
FIG. 3. is a cross-sectional view of the connecting tube ribbon along line 3—3 or 3'—3' of FIGS. 1 and 2.

FIG. 3 shows the cross-section of portion of the chamber wall separating the smaller chambers 22 or 22' with the larger chamber 26 or 26' as shown along lines 3—3 or 3'—3' of FIGS. 1 and 2, respectively. The connecting tubes 42 or 42' which connect valve openings 40 or 40' with the small chambers 22 or 22' and the side chambers 24 or 24' are grouped together side by side as a tube ribbon 50 or 50'. After leaving the valve openings 40 or 40', this tube ribbon 50 or 50' is attached along the side wall of the larger chamber 26 or 26' until it reached the smaller and side chambers, 22 or 22', and 24 or 24', respectively. From this point on the tube ribbon 50 or 50' passes through the partition wall 52 or 52' between the larger chamber 26 or 26' and the side chamber 24 or 24' or the smaller chamber 22 or 22'.

As shown in FIG. 3, the tube ribbon 50 or 50' passes through the partition wall 54 separating smaller chambers 22 or 22' and enters from one smaller chamber to the next smaller chamber along the partition wall 52 or 52'. One of the connecting tube 42 or 42' is terminated at each of the smaller or the side chamber 22, 24, 22' or 24' while the remaining of the tube ribbon 50 or 50' continue on to the remaining of the chambers. In an alternative embodiment, the tube ribbon 50 or 50' may remain at the larger chamber 26 or 26' side of the partition wall 52 or 52' and only one connecting tube at a time penetrates through the partition wall 52 or 52' and terminating at each of the smaller chambers 22 or 22', or the side chambers 24 or 24'. The connecting tube ribbon 50 is extruded with the same material as the tire insert 5 or 5', therefore, it can be vulcanized together to become an integral part of the tire insert 5 or 5'.

Figure 4:
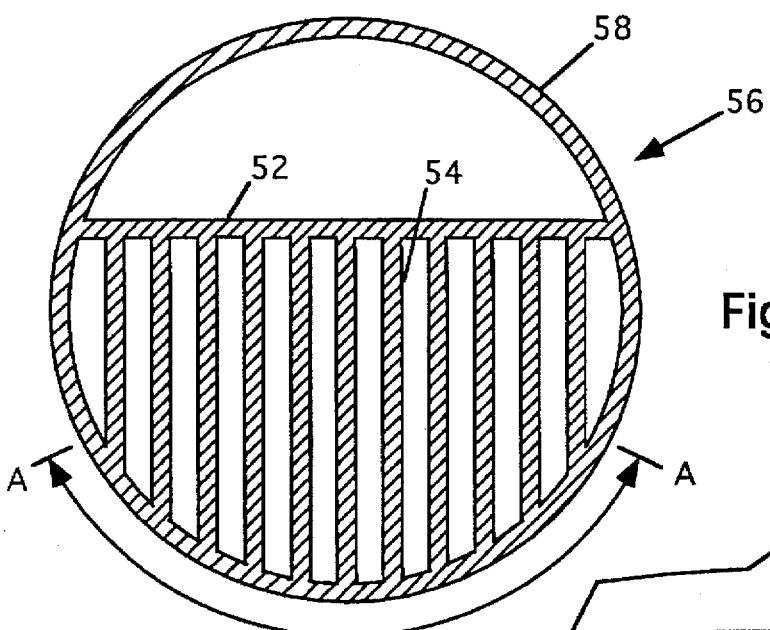
FIG. 4 is a cross-sectional view of the extrusion of the no-flat tire insert.

FIG. 4 shows the cross-section of the extrusion of the no-flat tire insert 56. It is extruded as a long straight tube 58 just the same as extruding a conventional inner tube, except that there are extra interior partitions 52 and 54 inside the tube 58 to form separate chambers. A desired length of the extruded tube 56 is cut at the green state. The valve body 30 is attached at near one end of the straight tube 58 in the same manner as attaching the valve of a conventional inner tube. The connecting tubes 42 in the form of a tube ribbon 50 as shown in FIG. 3, are connected and attached at one end to the valve openings 40 or 40' and the other ends to each of the smaller chambers 22 or 22' and side chambers 24 or 24'. The two ends of the extrusion 56 including the partition walls 52, 54 are spliced together afterward to form a donut shaped integral piece of the round tire insert 5 or 5'.

For the no-flat tire insert, the next and final step is placing the spliced green state rubber tire insert into a curing press to be vulcanized and made into a finished no-flat tire insert 5.

For the no-flat tire, the tire thread, the reinforcing bias layers, the steel belting, the tire thread, and the core of the tire is built and/or molded to the side wall 58 during the green state of the extrusion between the section marked by A—A in FIG. 4. The curing press will then vulcanize all these parts into a single piece of the no-flat tire 44.

Figure 5:
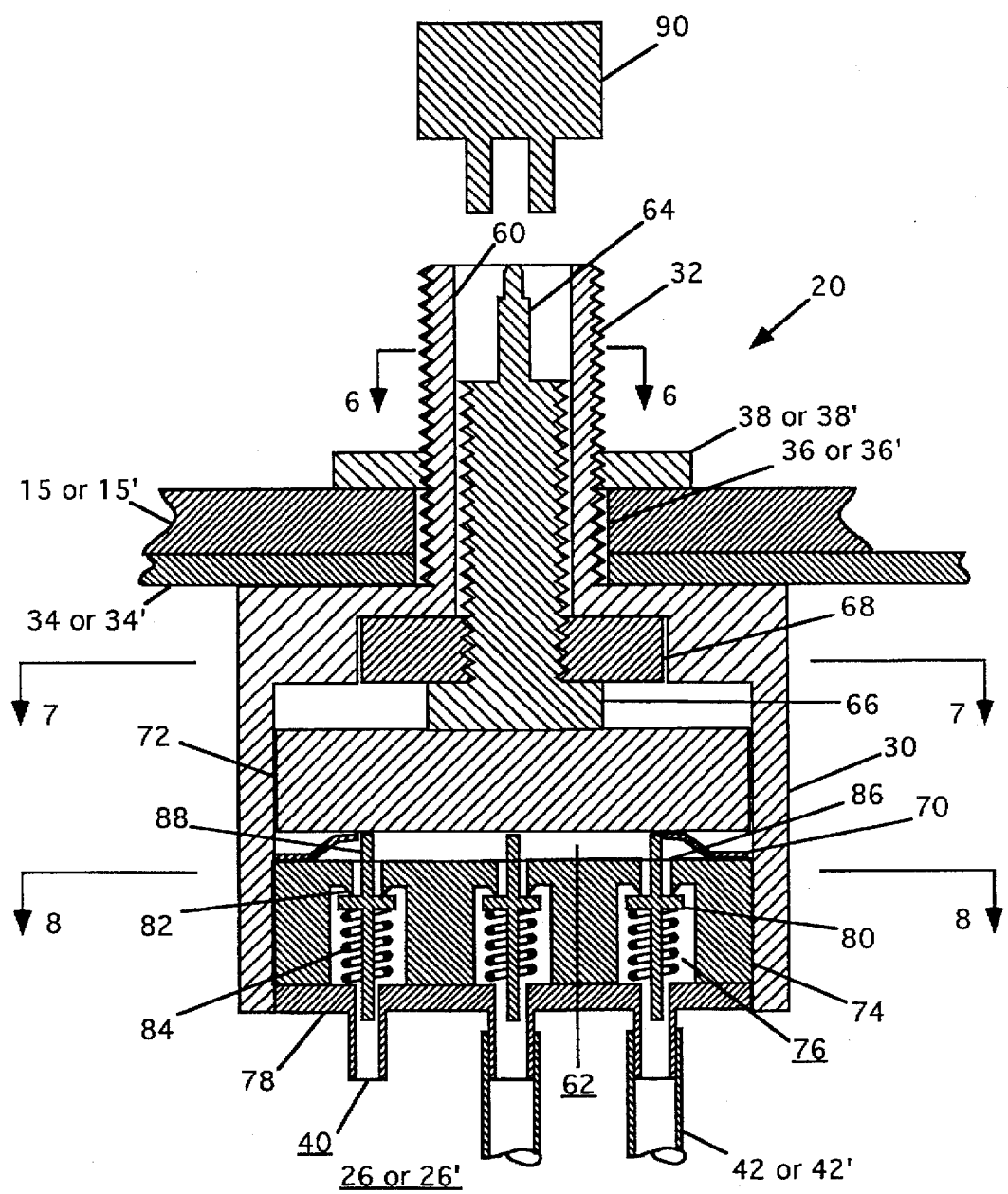
FIG. 5 is a cross-sectional view of the valve utilized in the present invention.

FIG. 5 is a cross-sectional view of the valve 20. It has a valve stem 32 and a valve body 30. Valve body 30 is a housing defining a valve stem bore 60 and distribution chamber 62 and is mounted inside the larger chamber of the no-flat tire or no-flat tire insert 26 or 26' at its side wall 34 or 34' (see FIGS. 1 or 2). While installed in the tire insert 5 and the tire rim 15, the valve stem 32 passes through the valve hole 36 or 36' of the rim 15 or 15' and is locked in place by a lock nut 38 or 38'. Push rod 64 has an end plate 66 at the lower end. A sliding nut 68 is screwed onto the push rod 64 near the end plate 66. Both push rod 64 and sliding nut 68 are inserted into the valve body 30 from the lower opening and can slide within the valve stem bore 60 of the valve stem 32. A spring 70 is upwardly biased against a push plate 72, lifting the end plate 66 and sliding nut 68 against the valve body 30 to prevent it from rattling. The push plate 72 is shaped to fit within the cavity formed by valve body 30 so that air can flow between the push plate and valve body 30. The distribution plate 74 in the distribution chamber 62 has the same number of cavities 76 as the number of chambers in the no-flat tire or no-flat tire insert. The enclosure plate 78 has a pluriality of valve openings 40 to close off the valve body 30 and the cavities 76 of the distribution plate 74 and connects the valve openings 40 to each individual chamber 22, 24, or 22', 24' via connecting tubes 42 or 42', or opens directly to the larger chamber 26 or 26'. Within each of the distribution plate cavities 76, there is a shut-off valve 80 biased against the valve seat 82 by the valve springs 84, with the valve rod 88 protruding through the charging hole 86. The valve body 30 do not have to be circular as will be shown in the alternate design to be described in FIG. 9 below, but if the cross-section of the valve body 30 is circular as shown, the push plate 72 and the end plate 66 could be combined as one plate instead of two plates.

Figure 6:
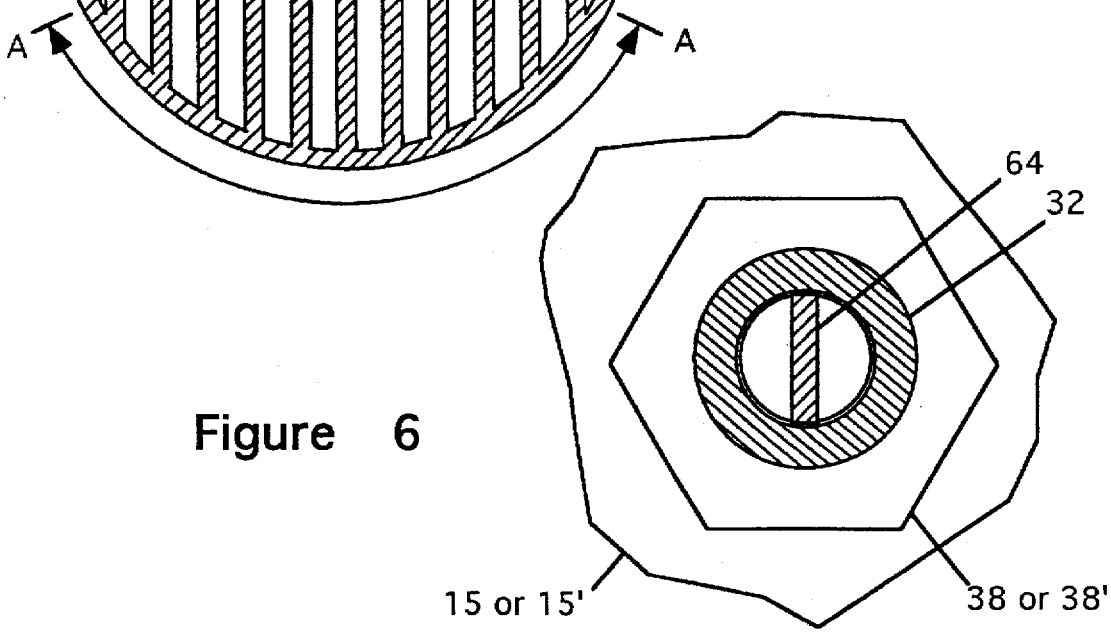
FIG. 6 is a cross-sectional view of the valve stem along line 6—6 of FIG. 5.

FIG. 6 is a cross-sectional view of the push rod 64 along line 6—6 of FIG. 5. At this section, the push rod 64 has a rectangular cross-section. This will allow the insert of valve key 90 to engage with the push rod 64. By turning the valve key 90 can cause the push rod 64 to be turned in either clockwise or counter-clockwise direction.

Figure 7:
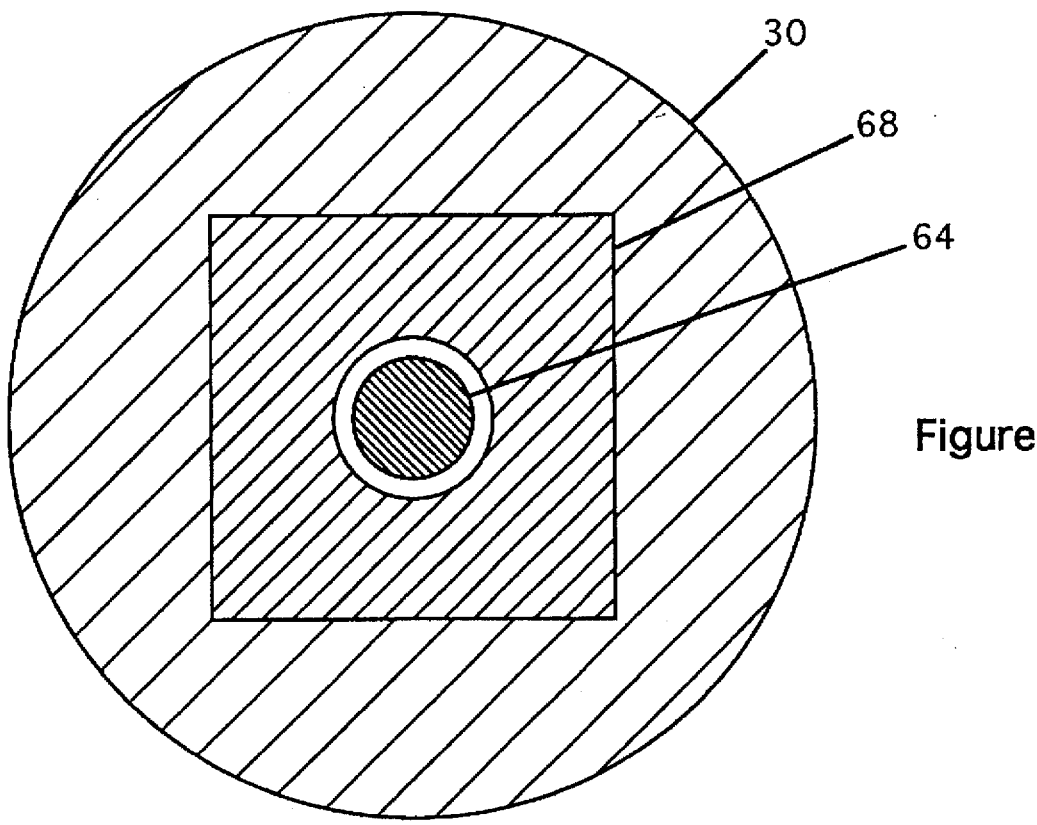
FIG. 7 is a cross-sectional view of the valve body taken along line 7—7 of FIG. 5.

FIG. 7 is a cross-sectional view of the valve body 30 along line 7—7 of FIG. 5. As shown, the sliding nut 68 and the inside cavity of the valve body 30 are square shaped or keyed and the sliding nut 68 can only be slide up or down (as shown in FIG. 5) in the valve body cavity and can not be turned. The turning of push rod 64 as described in FIG. 6 above will cause push rod to move up or down in relation with the sliding nut 68.

Figure 8:
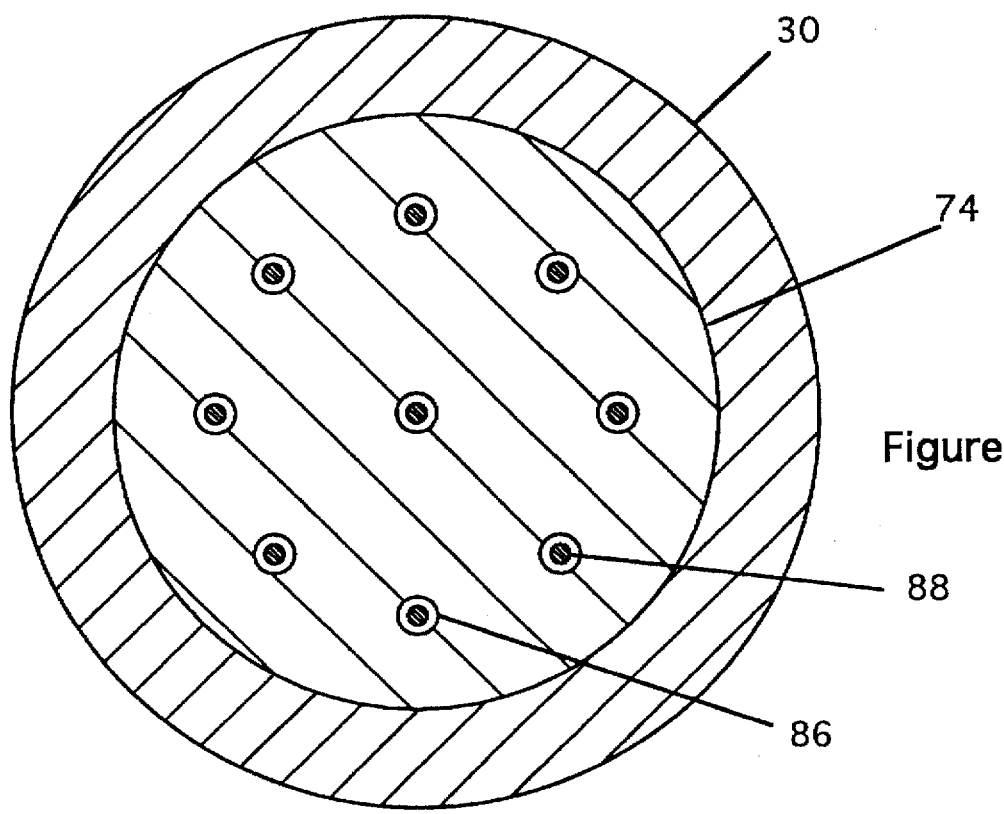
FIG. 8 is a cross-sectional view of the valve body taken along line 8—8 of FIG. 5.

FIG. 8 is a cross-sectional view of the valve body 30 and the distribution plate 74 along line 8—8 of FIG. 5. The number of air charging cavities are equal to the total number of the chambers in the no-flat tire or no-flat tire insert. A limited number of cavities shown are for illustration only.

Figure 9:
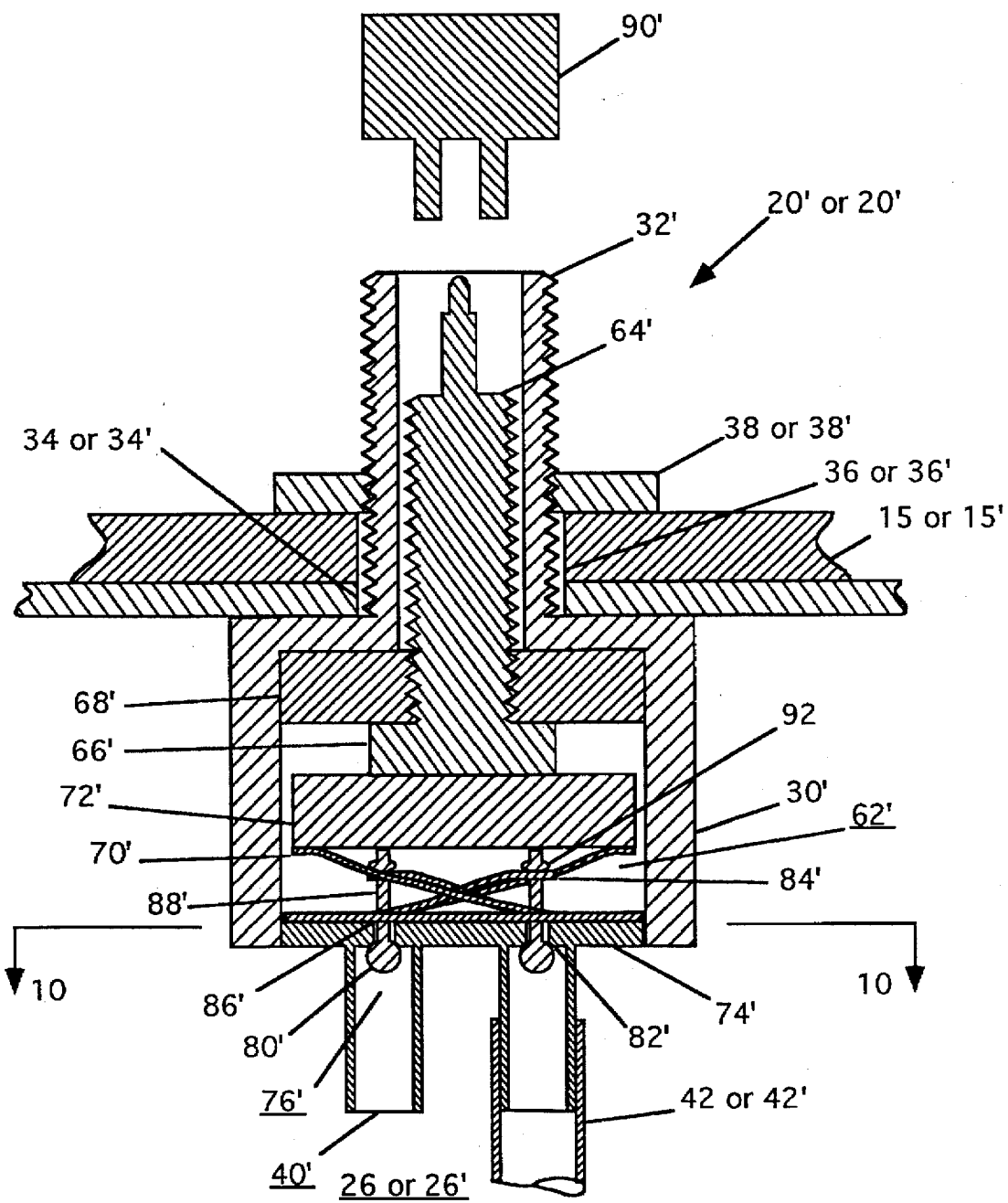
FIG. 9 is a cross-sectional view of an alternate design of the valve utilized in the present invention.

FIG. 9 is an alternate design of the valve 20 or 20'. The basic design of this valve is the same as that shown in FIG. 5 with few variations. Possibly other than the springs 70', 84', and shut-off valve rods 88', almost all other parts may be made of high strength plastic parts or moldings and ultrasonically welded wherever needed to simplify the design and reduce the cost. The valve body 30' could be other than circular (when parts are produced by injection molding, non circular valve body does not increase the overall cost significantly, if any). The shut-off valves 80' could be ball shaped or any other shapes suitable for sealing at the valve seat 82'. The seating surfaces of the shut-off valve may also be coated to improve the sealing capability. All the valve springs 70' and 84'may be stamped from one single piece of spring steel. Valve rods 88' protrude out from the charging holes 86' have small knots 92 near the tip of each valve rod 88'. These small knots 92 will enable the valve springs 84' to engage and lifting the shut-off valves 80' biasing against valve seat 82' to close the charging holes 86'.

FIG. 10 is the cross-sectional view along line 10—10 of FIG. 9. The cross-sectional shape of the valve body 30' is rectangular in this example. The narrower side of the rectangular valve body 30' will allow it to fit into the existing tire rim easier. Because the tire rim is more restrictive in its width direction and less restrictive in its circumferential direction. The distribution plate 74' is shown to have only a limited number of charging holes 86' and are for illustration only. The total number of charging holes will be equal to the total number of chambers of the no-flat tire or the no-flat tire insert.

FIG. 11 shows the plain view of the springs 70' and the valve springs 84' stamped out of one piece of spring steel, and FIG. 12 shows the cross-sectional view of this spring along line 12—12 of FIG. 11.

The operation of the valve 20 or 20' as shown in FIGS. 5 and 9 may be described as follows:

To inflate the tire (see FIG. 5 or 9), the pressurized air source (not shown) is coupled with the valve stem 32 or 32' and pushes down the push rod 64 or 64', the sliding nut 68 or 68' and the end plate 66 or 66'. The end plate 66 or 66' on the lower end of the push rod 64 or 64' presses down on the push plate 72 or 72' which in turn pushes against all the valve rods 88 or 88' and lifting all the shut-off valves 80 or 80' off the valve seats 82 or 82' of the distribution plate 74 or 74', thus opening the air charging holes 86 or 86' and causing the pressurized air to charge all the air chambers 22, 24, 26 or 22', 24', 26' simultaneously. After the desired air pressure is reached, the air source is de-coupled and removed from the valve stem 32 or 32'. The internal air pressure of the chambers and the valve springs 84 or 84' push up the shut-off valves 80 or 80' against the valve seat 82 or 82' and close off the charging holes 86 or 86' of the air passages. All air chambers become isolated from each other and the leakage or damage of any air chamber will not effect any other chambers.

To remove the tire from the rim, the tire must be deflated completely. To do so, a valve key 90 or 90' is inserted into the valve stem 32 or 32' and turns the push rod 64 or 64' clockwise as described in FIG. 6 above. Because the sliding nut 68 or 68' can not be turned with push rod 64 or 64', the push rod 64 or 64' turns downward from the sliding nut and pushes the push plate 72 or 72'downward, lifting all the shut-off valves 80 or 80' from the valve seats 82 or 82'. The shut-off valves 80 or 80' will remain open to let air to escape completely from the no-flat tire or no-flat fire insert. The push rod 64 or 64' can be turned with valve key 90 or 90' counter-clockwise later to raise the push rod 64 or 64'and end plate 66 or 66'. This will allow the push plate 72 or 72' to be lifted by spring 70 or 70' and valve rod 88 or 88' and allowing the shot-off valves 80 or 80' to be seated again against valve seats 82 or 82'. The valve will now be ready for charging the air again.

Various modifications to the depicted and described apparatus will be apparent to those skilled in the art. Accordingly, the forgoing detailed description of the preferred embodiment should be considered exemplary in nature and not as limiting to the scope and spirit of the invention as set forth in the appended claims.

What is claimed is:

1. A no-flat tire or no-flat tire insert comprising: a larger chamber and a plurality of smaller chambers, each of said chambers occupying a portion of the cross-section of the tire; and, a valve means for simultaneously charging and discharging said larger chamber and plurality of smaller chambers and isolating the chambers after charging, wherein the valve means includes:

a valve stem means defining a central push rod bore therethrough;

a distribution plate defining a plurality of cavities with openings therein, each of said openings connecting to the larger chamber and to a respective one of said plurality of smaller chambers with a connecting tube;

a plurality of shut-off valves, each including a valve rod protruding outside the distribution plate for each respective cavity and biased against a push plate with a spring for closing the shut-off valves;

a push rod with an enlarged end plate for biasing against the push plate for opening the shut-off valves;

a sliding nut and an enclosing valve body, wherein each are square shaped or keyed to prevent the sliding nut from turning relative to the enclosing valve body;

said sliding nut including threads for threading the sliding nut onto the push rod near the end plate so that the sliding nut moves with the push rod while being pushed up or down within the valve stem means;

said sliding nut allowing for the lowering or raising of the push rod while turning the push rod and causing the push plate to be pushed down for opening the shut-off valves.

2. The no-flat tire or no-flat tire insert of claim 1 wherein said larger chamber and plurality of smaller chambers comprises:

internal compartments forming said plurality of chambers with neighboring chambers sharing common side walls; and the larger chamber is located at the radially inner portion and the smaller chambers occupy the remainder portion of the tire.

3. The no-flat tire or the no-flat tire insert of claim 1 wherein the valve means is installed within said larger chamber with the valve stem protruding outside the larger chamber for mounting on the tire rim.

4. The no-flat tire or no-flat tire insert of claim 2 wherein the said internal valve means are connected to the larger chamber and to each of the plurality of smaller chambers with a connecting tube; and the said connecting tubes are arranged side by side to form a tube ribbon.

5. The no-flat tire or the no-flat tire insert of claim 1 wherein the larger chamber and plurality of smaller chambers and the connecting tube ribbon are extruded from the same material; and the assembled multiple chambers and the connecting tube ribbon are vulcanized together to form a single unit.

6. A no-flat tire comprising:

a tire with an integral larger chamber and a plurality of smaller chambers, each of said chambers occupying a portion of the cross-section of the tire; and, the larger chamber is located at the radially inner portion and the plurality of smaller chambers occupy the remainder portion of the tire;

an extruded tube with internal compartments forming said larger chamber and plurality of smaller chambers, the said extrusion of compartmented tube further includes the side walls and tire core by means of the same extrusion;

a valve means for simultaneously charging and discharging said larger chamber and plurality of smaller chambers and isolating the chambers after charging;

wherein the valve means comprises:
- a valve stem means defining a central push rod bore therethrough;
- a distribution plate defining a plurality of cavities with openings therein, each of said opening connect to the larger chamber and to a respective one of said plurality of smaller chambers with a connecting tube; and,
- an internal valve means for opening and closing said plurality of openings on said distribution plate;
- a plurality of shut-off valves, each including a valve rod protruding outside the distribution plate for each respective cavity and biased against a push plate with a spring for closing the shut-off valves;
- a push rod with an enlarged end plate for biasing against the push plate for opening the said shut-off valves;
- a sliding nut and an enclosing valve body, wherein each are square shaped or keyed to prevent the sliding nut from turning relative to the enclosing valve body;
- a spring means for biasing said push plate, end plate and sliding nut against said valve body;
- said sliding nut includes threads for threading the sliding nut onto the push rod near the end plate so that the sliding nut moves with the push rod while pushed up or down within the valve stem means;
- said sliding nut allowing for the lowering or raising of the push rod while turning the said push rod and causing the push plate to be pushed down for opening the shut-off valves.

7. The no-flat tire of claim 6 wherein the said internal valve means are connected to each small chamber with a connecting tube; and
- the said connecting tubes are arranged side by side to form a tube ribbon, which is extrudable from the same material; and
- the assembled chambers, the connecting tube ribbon, and the no-flat tire are vulcanized together to form a single unit.

8. A no-flat tire or no-flat tire insert comprising:
- a larger chamber and a plurality of smaller chambers, each of said chambers occupying a portion of the cross-section of the tire; and,
- the larger chamber located at the radially inner portion and the plurality of smaller chambers occupying the remainder portion of the tire;
- a valve means for simultaneously charging and discharging said larger chamber and plurality of smaller chambers and isolating the chambers after charging;

wherein the valve means includes:
- valve stem means defining a central push rod bore therethrough;
- a distribution plate defining a number of openings therethrough;
- each of said opening connect to the larger chamber and to one of said plurality of smaller chambers in the no-flat tire or no-flat tire insert with a connecting tube;
- internal shut-off valve means for opening and closing said plurality of openings on said distribution plate;
- said shut-off valves including a valve rod protruding through the distribution plate;
- a single spring biasing the shut-off valves into contact with the valve seat to close the valve openings.

9. The air charging and discharging valve of claim 8 comprises:
- the said spring means being punched out from a single piece of spring steel.

10. The air charging and discharging valve of claim 8 further comprises:
- a push rod with an enlarged end plate for biasing against the push plate for opening the said shut-off valves while pushing down against the valve rods of the said shut-off valves;
- a spring means for biasing said push plate, end plate and sliding nut against said valve body;
- a sliding nut and an enclosing valve body are square shaped or keyed to prevent the sliding nut from turning relative to the enclosing valve body;
- said sliding nut includes threads for threading the said sliding nut onto the push rod near the end plate so that the sliding nut moves with the push rod while pushed up or down within the valve stem;
- said sliding nut allowing for the lowering or raising of the push rod while turning the said push rod and causing the push plate to be pushed down and opening the shut-off valves.

11. The air charging and discharging valve of claim 8 wherein the said valve is made from high strength plastic parts of moldings; and
- the bonding of said plastic parts or moldings being performed by ultrasonic welding or adhesives.

* * * * *